3,005,853
PREPARATION OF MERCAPTAN AND SULFIDE DERIVATIVES THEREOF

Donovan R. Wilgus, Richmond, and Frank A. Stuart, Orinda, Calif., assignors to California Research Corporation, San Francisco, Calif., a corporation of Delaware
No Drawing. Filed June 22, 1959, Ser. No. 821,682
1 Claim. (Cl. 260—609)

This invention relates to the preparation of valuable mercaptans and sulfide derivatives thereof. More particularly, the invention is concerned with the preparation of polyglycol mercaptans and polyglycol sulfide block copolymers thereof useful as detergents and dispersants in mineral lubricating oils and hydrocarbon fuels, and also as surface-active agents for other general applications.

In accordance with the present invention, it has been found that polyglycol mercaptans can be prepared by the process which comprises reacting two moles of hydroxyalkyl mercaptan with iodine in the presence of an acid acceptor to produce dihydroxyalkyl disulfide, said alkyl group containing 2 to 7 carbon atoms, reacting the dihydroxy alkyl disulfide with from 10 to about 1400 moles of 1,2-alkylene oxide of 2 to 7 carbon atoms to give di(poly-1,2-alkylene-glycol) disulfide and heating said dipolyglycol disulfide in the presence of zinc metal in an acidic medium to give poly-1,2-alkylene glycol mercaptan having 5 to 700 alkylene glycol units of 2 to 7 carbon atoms each.

It has also been found that polyglycol sulfide-linked block copolymers can be prepared by the additional step of reacting said mercaptan in the presence of a free-radical initiator catalyst with alkyl ester of $\alpha,\beta$-unsaturated monocarboxylic acid of from 3 to 8 carbon atoms to give poly-1,2-alkylene glycol polyalkyl ester sulfide-linked block copolymer in which said alkyl groups amount to from about 40 to about 96% by weight of said block copolymer.

The production of polyglycol mercaptan and polyglycol sulfide-linked block copolymers thereof is readily accomplished in the process of the invention as described above. Special reaction condition and expensive reactors are not required. Furthermore, the reactants are of types which are commonly available. The reactions are useful without extensive purification procedures.

The polyglycol group of the compounds prepared in accordance with the process of this invention preferably contains at least 5 alkylene oxide units with alkylene groups of from 2 to 7 carbon atoms each, as mentioned above. Up to 700, preferably 230, of these alkylene oxide units may be present in the polyglycol group. The end of the polyglycol group, other than that linked to the sulfide group, may be hydroxyl or alkyl, or it may have other terminal groups, including polar groups.

Poly-1,2-alkylene glycols and their alkyl ethers are preferred. For present purposes, the most suitable poly-1,2-alkylene glycol groups are those derived from ethylene oxide or from 1,2-propylene oxide, or mixtures thereof, which have molecular weights or average molecular weights between about 220 and 30,000, preferably between about 400 and 10,000. These polyalkylene glycol groups provide outstanding detergent copolymers.

The following polyalkylene glycol groups containing from 2 to 7 carbon atoms in each alkylene group are illustrative of the types described above.

—($CH_2$—$CH_2$—O)$_5$—$OC_2H_5$

—($CH_2$—$CH_2$—O)$_7$—$CH_2CH_2N(C_2H_5)_2$

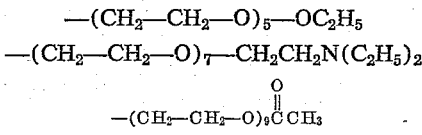

—[$CH(CH_3)CH_2$—O]$_5$—$C_6H_5$

—[$CH(CH_3)CH_2$—O]$_7$—$SC_{12}H_{25}$

—[$CH_2$—$CH_2$—O—$CH(CH_3)CH_2$—O]$_5$—H

—($CH_2$—$CH_2$—O)$_9CH_3$

—($CH_2$—$CH_2$—O)$_{13}$—$C_8H_{17}$

—($CH_2$—$CH_2$—O)$_{13}$—$C_{12}H_{25}$

—($CH_2$—$CH_2$—O)$_{13}$—$C_{18}H_{37}$

—[$CH_2$—$CH(CH_3)$—O]$_{30}$H

—($CH_2$—$CH_2$—$CH_2O)_{40}$H

—($C_5H_{10}O)_5$H

Polyethylene glycol mixtures having average molecular weights of 220, 400, 1000, 1540, 2000 or 10,000 and monoalkyl ethers thereof.

Poly-1,2-propylene glycol mixtures having average molecular weights of 425, 1025 or 10,000 and monoalkyl ethers thereof.

The hydroxyalkyl mercaptan employed in the process preferably contains from 2 to 7 carbon atoms, although longer alkyl groups are not precluded. Suitable hydroxyalkyl mercaptans are $\beta$-hydroxyethyl mercaptan, $\gamma$-hydroxypropyl mercaptan, 2-hydroxybutyl mercaptan, 3-hydroxyheptyl mercaptan, 2-hydroxydodecyl mercaptan, and the like. The hydroxyethyl mercaptan and the hydroxypropyl mercaptans are most preferred for present purposes.

In the reaction of the hydroxyalkyl mercaptan to produce the dihydroxyalkyl disulfide, a halogen such as iodine is employed. In this reaction, an acid acceptor is desirable to take up the hydrogen halide formed in the reaction. Suitable acceptors include pyridine, $\alpha$-picoline, and similar well-known amine acid acceptors.

The dihydroxyalkyl disulfide is preferably reacted with 1,2-alkylene oxide of the aforementioned type, to give the di(polyalkylene glycol) disulfide. The reaction is conveniently carried out in the presence of a basic esterification catalyst such as sodium methylate. As soon as the desired amount of alkylene oxide has been reacted with the dihydroxyalkyl disulfide, the reaction is terminated simply by stopping the alkylene oxide feed.

The di(polyalkylene glycol) disulfide obtained in accordance with the procedure outlined above is converted to the corresponding polyalkylene glycol mercaptan by heating in the presence of zinc metal in an acidic medium. Glacial acetic acid is suitable for this purpose.

The polyglycol sulfide-linked block copolymers according to the process of this invention are prepared by chain transfer of suitable vinyl monomers off of the polyglycol mercaptan. Suitable monomers for this purpose are any of the known compounds having at least one ethylenic linkage which are characterized by the ability to polymerize through said ethylenic linkage in the presence of a conventional free radical initiator catalyst. Such monomers may be illustrated by the following general formula:

$$R_1(G')_{n'}CH=CH(G)_nR_2$$

in which $R_1$ and $R_2$ are members of the group consisting of hydrogen and hydrocarbon radicals of from 4 to 30 carbon atoms, at least one of which is an aliphatic hydrocarbon group of from 4 to 30 carbon atoms in the case of the ether and ester monomers as described above, G and G' are members of the class consisting of oxy(—O—) ether and carbonyloxy

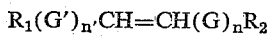

ester groups and $n$ and $n'$ are 0 or 1. The hydrocarbon radicals may be alkyl, cycloalkyl, alkenyl, alkaryl.

Representative monomers of the above types include the following:

OLEFINS

| | |
|---|---|
| Ethylene | Cyclohexene |
| Propylene | Octadecene-1 |
| Di and triisobutylene | p-Octylstyrene |

ETHERS

| | |
|---|---|
| Vinyl n-butyl ether | Methallyl n-decyl ether |
| Vinyl 2-ethylhexyl ether | 1-eicosenyl decyl ether |

ESTERS

| | |
|---|---|
| Vinyl oleate | Cyclohexyl methacrylate |
| Allyl stearate | n-Butyl-2-eicosenoate |
| Dodecyl acrylate | Dihexadecyl maleate |
| Hexadecyl methacrylate | Didodecyl maleate |
| Vinyl p-n-octyl benzoate | 1-decenyl laurate |

Although any of the monomers described above will give the polyglycol sulfide-linked block copolymers in accordance with the process of the invention, the higher alkyl esters of $\alpha,\beta$-unsaturated monocarboxylic acids of from 3 to 8 carbon atoms having alkyl groups of from 8 to 30 carbon atoms are preferred, both for availability and effectiveness of copolymers prepared from them.

As mentioned above, the reaction in the chain transfer of the vinyl monomer is carried out in the presence of a conventional free radical initiator. The polyglycol mercaptan functions as a chain transfer agent. The monomer units add on in a continuous fashion during the reaction to provide the block copolymer.

The preparation of the polyglycol sulfide-linked block copolymers is conveniently carried out in the presence of an inert organic solvent such as benzene, toluene, xylene or petroleum naphtha. The free radical-liberating type of initiator catalyst may be benzoyl peroxide, tertiary-butyl hydroperoxide or azobisisobutyronitrile. The initiator is employed in small amounts of from about 0.001 to 10% by weight, preferably 0.1 to 2%, and may be added in increments as the reaction proceeds in order to maintain constantly desired reaction conditions.

In preparing the polyglycol sulfide-linked block copolymers of the invention, it is important to obtain an oil-soluble final product; that is, one which is soluble in lubricating oil or other hydrocarbon fraction to the extent of at least 0.0005%, and preferably 0.5% or more by weight. Since the various oil-solubilizing aliphatic hydrocarbon groups differ somewhat in their oil-solubilizing characteristics, preliminary tests are carried out with the additive to determine whether the relative proportion of aliphatic hydrocarbon in the block copolymer is high enough to impart the desired degree of oil solubility. If the solubility in oil is unduly low, the proportion of aliphatic hydrocarbon groups is easily increased to raise the oil solubility to the desired level in accordance with the methods already described. In general, satisfactory oil solubility and surface-active properties are obtained with block copolymers wherein the aliphatic and cycloaliphatic oil solubilizing hydrocarbon groups constitute from about 40 to about 96% by weight of the block copolymer.

The polyglycol sulfide-linked copolymers of the invention have apparent molecular weights as determined by standard light scattering methods of at least 2,000. For practical purposes, molecular weights of from 50,000 to 500,000 are particularly suitable from the standpoint of viscosity and other physical characteristics of the block copolymer additives.

The following examples illustrate the preparation of the polyglycol mercaptans and block copolymers thereof in accordance with the process of the invention. Unless otherwise specified, the proportions are given on a weight basis.

Example I

This example shows the preparation of $\beta,\beta'$dihydroxyethyldisulfide intermediate according to the following reaction:

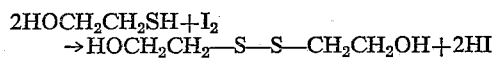

To a solution of iodine (77 grams, 0.3 mole) and pyridine (23.7 grams, 0.3 mole) in 400 ml. of ether was added slowly with stirring a solution of 2 mercaptoethanol (23.4 grams, 0.3 mole) in 100 ml. of ether. After 2 hours, pyridine (31.6 grams, 0.4 mole) was added to remove orange-yellow color. The ether solution was decanted from the salt, dried over calcium chloride for 45 minutes and finally filtered. The filtrate was concentrated on the steam plate until two phases formed. The bottom phase (12.1 grams), which contained the disulfide, was collected. The top phase was concentrated on the steam plate to obtain a second disulfide fraction (9.0 grams). After combining the two fractions, the total concentrate was extracted with three 30 ml. portions of benzene to remove residual 2-mercaptoethanol. To insure complete removal of mercaptan, mesitylene (38 grams) was added to the disulfide layer and product was topped to 88° C./3 mm. The crude disulfide was obtained in 27.5% yield.

Example II

This example illustrates the preparation of polyethylene glycol disulfide intermediate according to the following reaction:

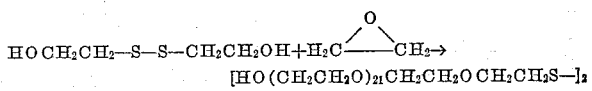

A mixture of the disulfide (10.7 grams, 0.07 mole), sodium methylate (0.695 gram, 0.013 mole) and 40 ml. of toluene was heated to reflux. After the toluene-methanol azeotrope (0.5 ml.) was distilled off, the excess toluene was removed under vacuum to yield 11.6 grams of crude $\beta,\beta'$-dihydroxyethyl disulfide in which some of the hydroxyl groups were converted to the sodium salt. 6.4 grams of this product was charged to a 1-liter rocker type autoclave. After flushing the system with nitrogen, the temperature was increased slowly, and ethylene oxide was introduced at ca. 50 grams per hour by means of a proportioning pump. When the temperature reached 50° C. and 100 grams of ethylene oxide had been added, the exothermic reaction started and the temperature increased to 110° C. The temperature was then maintained at 110+10° C. by adding ethylene oxide and heat. A total of 700 grams of ethylene oxide was added over a total reaction time of 10 hours. Throughout the reaction, the pressure remained at about 200 lbs. per square inch gauge. After allowing the autoclave to cool to 70° C., the product was removed and dissolved in 300 ml. of benzene. This solution was treated with 6 ml. of concentrated hydrochloric acid to neutralize the salt, and then water, excess acid and benzene were removed under reduced pressure to yield 656 grams of polyethylene glycol disulfide.

Example III

This example shows the preparation of polyethylene glycol mercaptan intermediate according to the following reaction:

A mixture of polyethylene glycol disulfide (267 grams, 0012 mole), 30 mesh zinc metal (100 grams, 1.54 moles) 200 ml. of glacial acetic acid and 557 ml. of benzene was maintained under reflux with stirring for 8 hours. The reaction mixture was filtered and the benzene and acetic acid removed by vacuum distillation to yield 250 grams of polyethylene glycol mercaptan (molecular weight about 10,000).

Example IV

This example illustrates the preparation of polyethylene glycol sulfide-linked polyalkyl methacrylate block copolymer in which the alkyl methacrylates are mixed octadecyl and tridecyl methacrylate.

A mixture of octadecyl methacrylate and tridecyl methacrylate (40:60 weight ratio) amounting to 220 grams (0.07 mole) and 73 grams of polyethylene glycol mercaptan (0.0073 mole) prepared as above were mixed with 410 ml. of benzene. The mixture was refluxed under a nitrogen atmosphere with stirring. After the initial addition of 3.9 ml. of a 1% solution of azobisisobutyronitrile, the initiator catalyst level was maintained at 0.015% by adding 1.9 ml. of 1% solution every 15 minutes. After five hours, the reaction mixture was allowed to come to room temperature. A sample of approximately 100 grams was taken and the polymer was precipitated with acetone to remove unreacted monomer.

The polyglycol sulfide-linked block copolymer obtained above was dissolved in benzene and this solution was added to 20 grams of 150 neutral mineral lubricating oil. The mixture was then stripped at a temperature of 120° C. at a pressure of 5 mm. of mercury to yield a 30% oil concentrate of block copolymer detergent. This concentrate was used in the preparation of hydrocarbon compositions which was effective in detergency tests.

Other variations in the types of reactants and reaction conditions within the scope of this invention will be apparent to one skilled in the art from the above disclosure and illustrative examples.

We claim:

Process which comprises reacting two moles of a hydroxyalkyl mercaptan with one mole of iodine in the presence of acid acceptor to produce one mole of the corresponding dihydroxyalkyl disulfide, said alkyl group containing 2 to 7 carbon atoms, reacting the dihydroxyalkyl disulfide with from 10 to about 1400 moles of 1,2-alkylene oxide of 2 to 7 carbon atoms to give di-(poly-1,2-alkylene glycol) disulfide and heating said dipolyglycol disulfide in the presence of zinc metal in an acidic medium to give poly-1,2-alkylene glycol mercaptan having 5 to 700 alkylene glycol units of 2 to 7 carbon atoms each.

References Cited in the file of this patent

UNITED STATES PATENTS

| | | |
|---|---|---|
| 2,434,054 | Roedel | Jan. 6, 1948 |
| 2,484,369 | Ballard et al. | Oct. 11, 1949 |
| 2,518,245 | Morris et al. | Aug. 8, 1950 |

OTHER REFERENCES

Ellis: "Chemistry of Synthetic Resins," vol. 2, Reinhold Publishing Corp., New York, 1935, page 990.

Flory: "Principles of Polymer Chemistry," Cornell University Press, Ithaca, New York, 1953, pp. 146–148.

Noller: "Chemistry of Organic Compounds," W. B. Saunders Co., 1951, pp. 265–268, Philadelphia, Pa., 1st edition.